United States Patent
Balatsos et al.

[11] Patent Number: 6,072,507
[45] Date of Patent: Jun. 6, 2000

[54] METHOD AND APPARATUS FOR MAPPING A LINEAR ADDRESS TO A TILED ADDRESS

[75] Inventors: Aris Balatsos, Toronto; Milivoje Aleksic, Richmond Hill; Gordon Caruk, Bramalea, all of Canada; Andrew E. Gruber, Arlington, Mass.

[73] Assignee: ATI Technologies, Inc., Thornhill, Canada

[21] Appl. No.: 09/058,949

[22] Filed: Apr. 10, 1998

[51] Int. Cl.[7] .................................................. G06F 12/06
[52] U.S. Cl. .......................................... 345/516; 711/203
[58] Field of Search .................................... 345/515, 516, 345/501, 507–509; 711/202, 203, 206

[56] References Cited

U.S. PATENT DOCUMENTS

| | | | |
|---|---|---|---|
| 5,828,382 | 10/1998 | Wilde ....................................... | 345/501 |
| 5,844,576 | 12/1998 | Wilde et al. ............................ | 345/525 |
| 5,990,912 | 11/1999 | Swanson ................................. | 345/516 |

*Primary Examiner*—Kee M. Tung
*Attorney, Agent, or Firm*—Markison & Reckamp

[57] ABSTRACT

A method and apparatus for mapping a linear address to a tiled address that reduces latency between retrieval of pages of data is accomplished when a video graphics processor receives a linear address from the central processing unit and determines whether the linear address is referencing a tiled surface, which is one of up to four portions of the memory. If so, the video graphics processor obtains parameters of the tiled surface. Having obtained the parameters, the video graphics processor determines a normalized linear address based on at least one of the parameters and the linear address. Having done this, the video graphics processor determines a band pointer of the tiled surface based on at least one of the parameters, the normalized linear address and a modular function. In essence, the band pointer points to a normalized initial address of a band of a tiled surface, which includes a plurality of bands. Having obtained the band pointer, the video graphics processor then determines a linear band offset based on the band pointer and at least one of the parameters. Next, a tiled band offset is determined based on the linear band offset. Finally, the tiled address is determined based on the tiled band offset, the band pointer, and at least one of the parameters.

33 Claims, 9 Drawing Sheets

METHOD AND APPARATUS FOR MAPPING A LINEAR ADDRESS TO A TILED ADDRESS

TECHNICAL FIELD OF THE INVENTION

This invention relates generally to memory mapping and more particularly to memory mapping within video graphic circuits.

BACKGROUND OF THE INVENTION

Computers are known to include a central processing unit, video processing circuitry, audio processing circuitry, and input/output ports to interface with peripheral devices. Such peripheral devices include a display such that applications being executed by the central processing unit may be visible to the computer user. The object, or image, elements being displayed are generated by, or caused to be generated by, the central processing unit and provided to the video processing circuitry. The video processing circuitry renders the object, or image, elements into pixel data wherein the pixel data is provided to the display.

As part of the processing of object, or image, elements, the video graphic circuitry stores the pixel data in memory, which is often referred to as a frame buffer. Typically, each entry in the frame buffer will correspond to a pixel location on the display. For example, for a 640×480 pixel display, the first entry of memory will correspond to pixel location (0,0), the second memory location to pixel (1,0), the third to pixel location (2, 0), etc. As such, the first 640 entries in the memory correspond to the first line of the display. The second 640 entries in the memory correspond to the second line of the display, the third 640 entries in memory correspond to the third line, etc.

While linearly mapping the physical pixel locations to the memory locations provides a straightforward implementation, there are certain drawbacks. For example, when objects are being rendered by the video processing circuit the objects typically occupy more than one line. In other words, the objects being rendered have an X value greater than 1 and a Y value greater than one. To render such an object when linear mapping is used, each line containing pixel data for the object would need to be retrieved from memory. To improve the efficiency of data retrieval from memory, pipeline memory retrieval circuitry may be used, such that pixel data is retrieved with each clock cycle. However, the pipeline process only works when a particular line, which is often referred to as a page, is being retrieved. When a subsequent page needs to be retrieved, it takes seven clock cycles to fill the pipe and to set the buffers. Thus, to render a triangle that has an X value of 10 and a Y value of 10, 120 cycles are required. Of the 120 cycles, fifty are required to retrieve the pixel data for the 50 pixels of the triangle, while 70 cycles are required to jump to the next page. Thus, data is being retrieved at 2.4 clocks per pixel.

To reduce the latency in the linear mapping, the memory may be arranged in tiles. By tiling the memory, there is no longer a linear relationship between the pixel locations and addresses within the memory. Each tile corresponds to a block of physical pixel locations of the display, where, within the tile, the addresses map linearly to the pixel location within the tile. For example, the first 640 entries in the memory may correspond to a block on the physical display of 10 lines of the first 64 pixels. In other words, pixel location (0, 0) through pixel location (64, 0); pixel location (0, 1) through (63,1); up to pixel location (0, 9) through pixel location (63, 9) are included in this tile and occupy the first 640 entries in the frame buffer. Thus, with tiled grouping, when an object falls within a particular tile on the display, only one page is required to render the object. If however, the object occupies more than one tile, the latency from retrieving the next page is still present.

Therefore, a need exists for a method and apparatus that reduces latency in the retrieval of tiled memory blocks.

DETAILED DESCRIPTION OF A PREFERRED EMBODIMENT

Generally, the present invention provides a method and apparatus for mapping a linear address to a tiled address that reduces latency between retrieval of pages of data This may be accomplished when a video graphics processor receives a linear address from the central processing unit and determines whether the linear address is referencing a tiled surface, which is one of up to four portions of the memory. If so, the video graphics processor obtains parameters of the tiled surface. Having obtained the parameters, the video graphics processor determines a normalized linear address based on at least one of the parameters and the linear address. Having done this, the video graphics processor determines a band pointer of the tiled surface based on at least one of the parameters, the normalized linear address and a modular function. In essence, the band pointer points to a normalized initial address of a band of a tiled surface, which includes a plurality of bands. Having obtained the band pointer, the video graphics processor then determines a linear band offset based on the band pointer and at least one of the parameters. Next, a tiled band offset is determined based on the linear band offset. Finally, the tiled address is determined based on the tiled band offset, the band pointer, and at least one of the parameters. With such a method and apparatus, a tiled memory can be accessed with a minimal amount of latency, especially when the memory is incorporated in a video graphics processing system.

Figure 1:
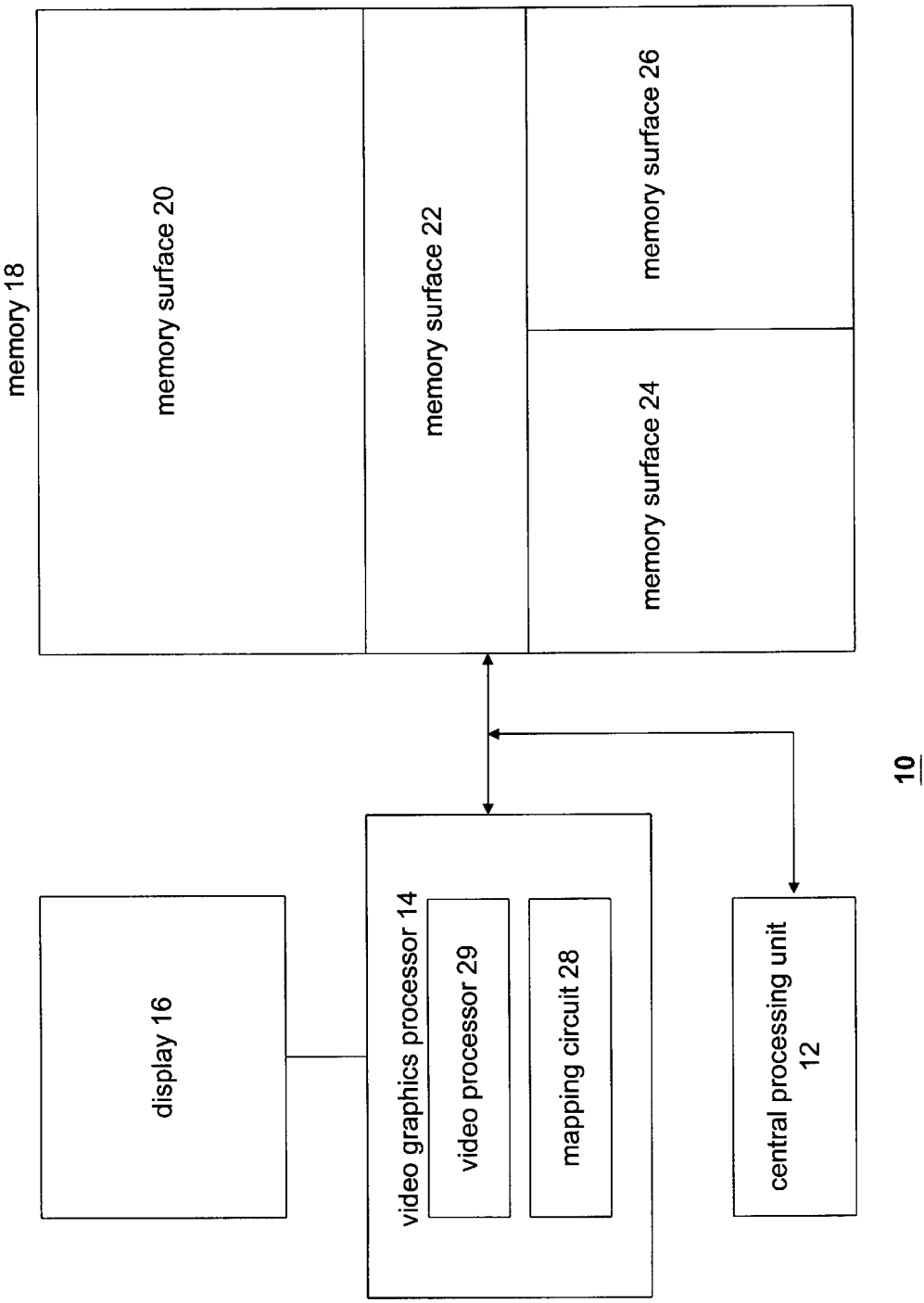
FIG. 1 illustrates a computer system in accordance with the present invention.

FIG. 1 illustrates a schematic block diagram of a computer system 10 that includes a central processing unit 12, a video graphics processor 14, a display 16, and memory 18. Note that the memory 18 may be the main memory of the computer system 10 and/or the frame buffer associated with the video graphics processor 14. In either case, the memory 18 stores the pixel data for display in one of the memory surfaces 20–26.

The video graphics processor 14 includes a mapping circuit 28 and a video processor 29. The mapping circuit 28 performs the function of correlating a linear address to a tiled address. The details of the functionality of the mapping circuit 28 will be discussed in greater detail with reference to FIGS. 3 through 9. The video processor 29 performs the functions of rendering objects to produce the pixel data. The general functionality of the video processor is known. Thus no further discussion would be presented except to further illustrate the present invention.

Figure 2:
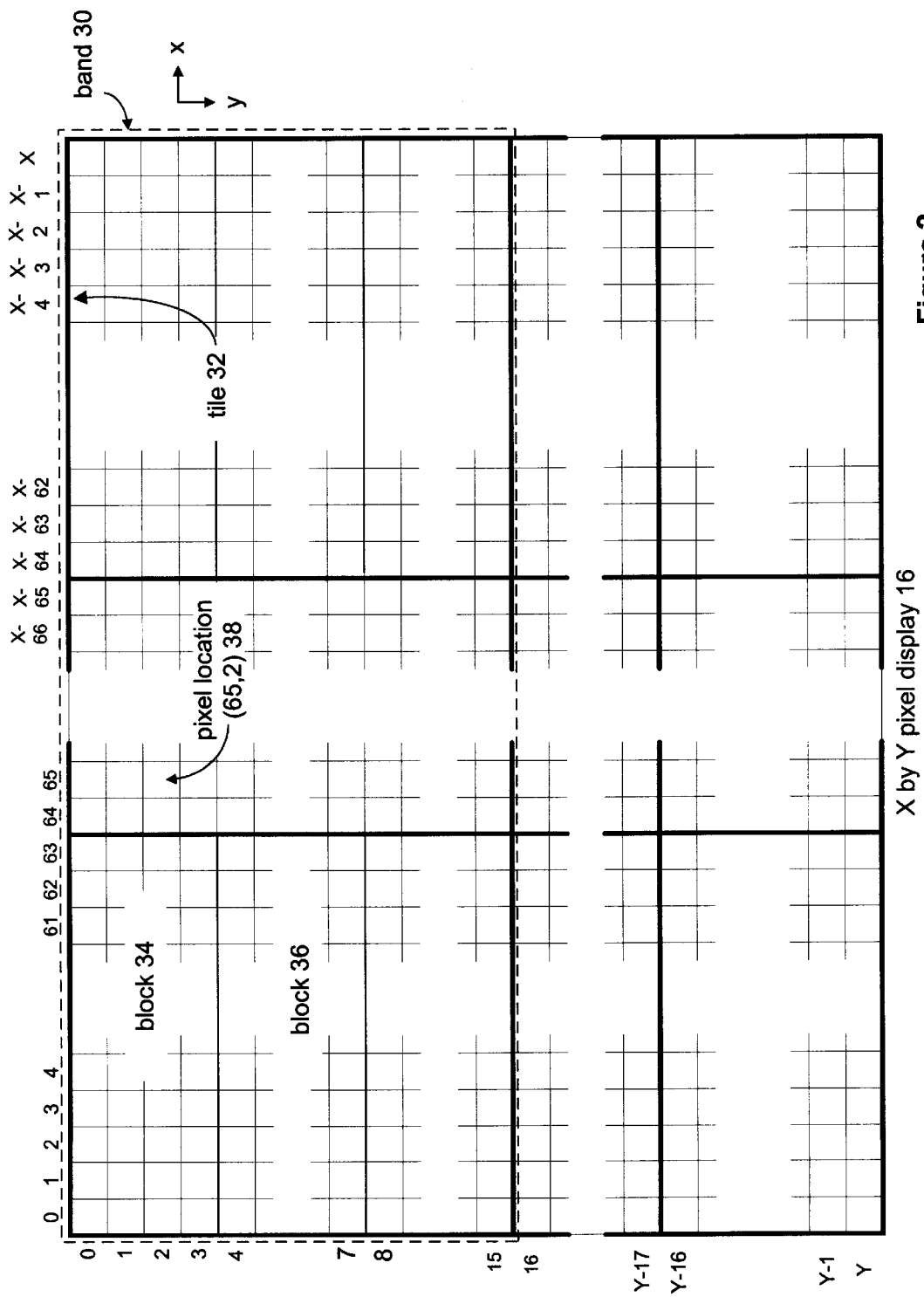
FIG. 2 illustrates the display of FIG. 1.

FIG. 2 illustrates a graphical representation of the display 16. The display 16 is shown to be an X by Y pixel display. As such, in the X direction, the display includes X number of pixels and in the Y direction it includes Y number of lines. For example, the X direction may include 640 pixels while the Y direction includes 480 lines. As shown, the display 16 is partitioned into a plurality of bands 30. The first band is shown by the dotted line, which encircles the first 16 lines of display 16. As such, for this example, each band includes 16 lines of the display. Thus, in a 480 line display, there are 30 bands. As one of average skill in the art will readily appreciate, the number of lines in a band may vary to accommodate the display and/or the memory.

Each band is divided into a plurality of tiles 32. As shown, a tile is represented by 64 pixels in the X direction and 16 lines in the Y direction. Thus for the 640×480 display, there are 10 tiles per band. Each of the tiles is further divided into blocks 34 and 36 where each block is represented by 64 pixels by 4 lines. In other words, each block includes 256 pixel locations but within a confined area of 64 pixels by 4 lines. Note that each pixel location 38 is referenced first by its X coordinate and then by its Y coordinate. For example, pixel location (65, 2) is referenced the pixel located at the $65^{th}$ pixel of the second line of the display.

Figure 3:
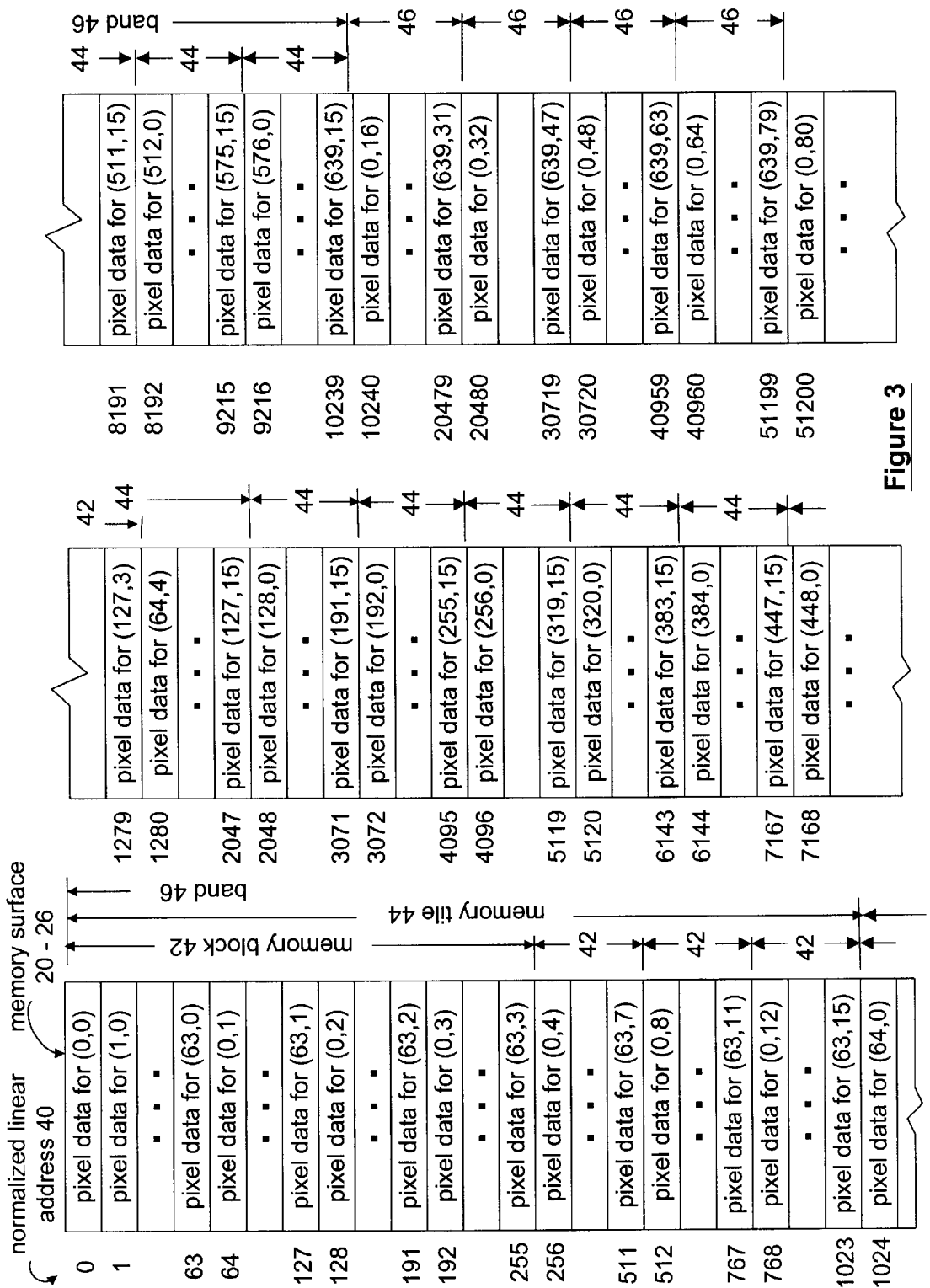
FIG. 3 illustrates tiled mapping in accordance with the present invention.

The partitioning of the display 16 in such a manner allows for correspondingly mapping tiles of the display to tiles of the memory. Referring now to FIG. 3, a tiled memory surface 20–26 is shown. Each memory block 42 corresponds to a block 34, 36 of FIG. 2. Each memory tile 44 corresponds to a tile 32 of a particular band. Each memory band 46 corresponds to a band 30 of FIG. 2. For this particular tiled memory surface 20–26, the memory locations are referred to as normalized linear addresses 40. In other words, the first address of the tiles memory surface 20–26 is considered to be address 0 (decimal). As such, for the example shown, the first 256 normalized linear addresses correspond to the pixel data contained within the first block 34 of the first band.

The next memory block, which begins at normalized linear address 256, stores the pixel data for the next memory block 36 of the first tile. This block occupies normalized address 256 through 511. The third memory block of the tile occupies normalized linear address 512 through 767, and the fourth memory block of this tile occupies memory locations 768 through 1023. As such, the first tile of the first band of this particular tiled memory surface occupies the first 1,024 memory locations. The second 1,024 memory locations are occupied by the second tile of the memory, where each of the remaining 8 tiles occupy the next consecutive 1,024 memory locations. This, of course, assumes each line contains 640 pixels.

At normalized linear address 10,240, the second band of the memory surface begins. This band occupies the next 10,240 memory locations, the third band occupies the next 10,240 memory locations, as so. As such, the display now is mapped into a tiled memory surface.

Figure 4:
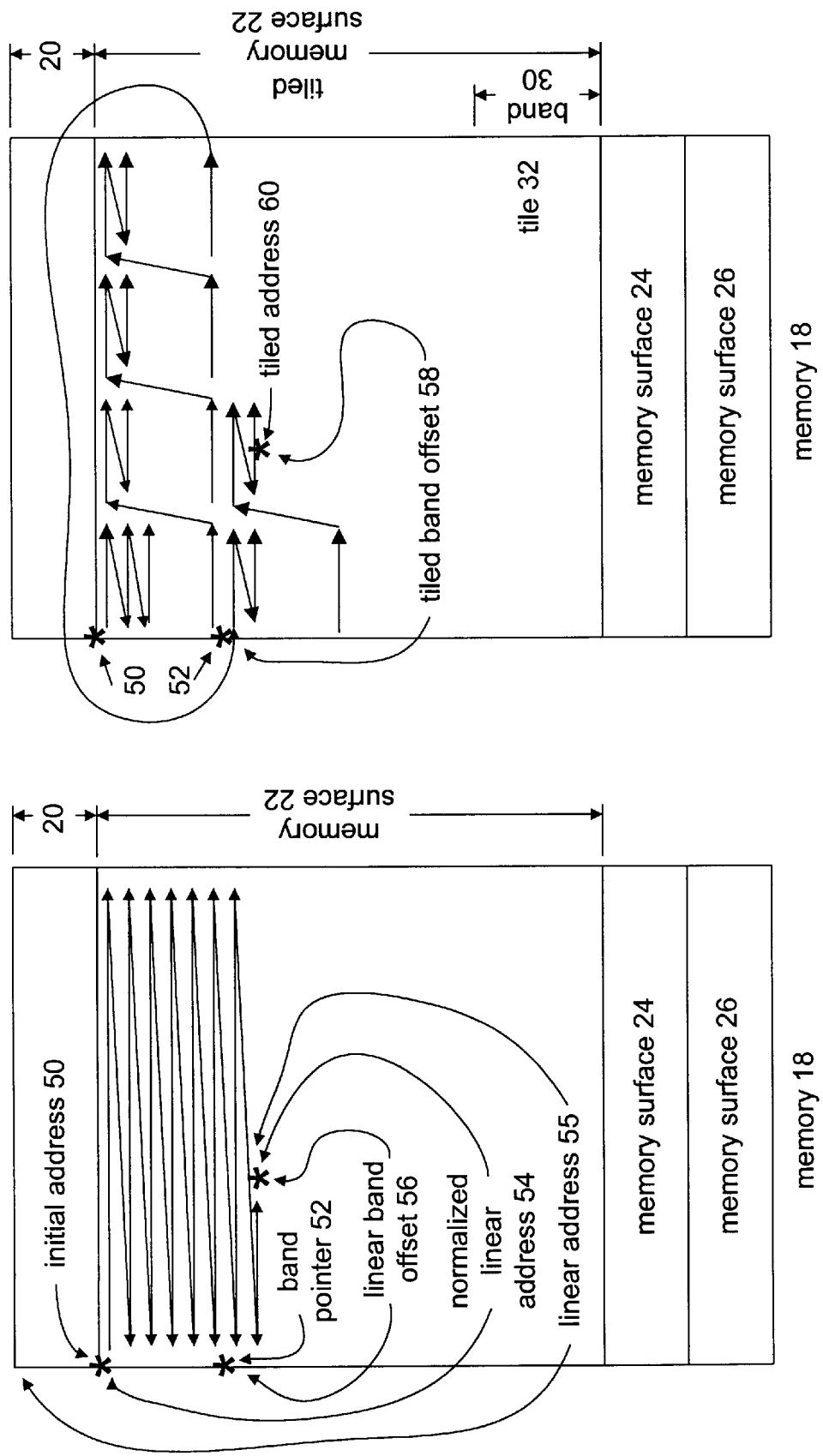
FIG. 4 illustrates another representation of tiled mapping in accordance with the present invention.

FIG. 4 illustrates a graphical representation of transforming a linear address 55 into a tiled address 50. The linear address 55 is received from the central processing unit, wherein the linear address is a linear value of the memory, which is referenced from the first entry in the memory 18. This is shown on the left side of FIG. 4 which points to the top left corner of the memory 18 and corresponds to the actual linear address 55. Note that the beginning address of memory 18 begins with the first memory surface 20. To obtain the normalized linear address 54 for the linear address 55, the initial address 50 of memory surface 22 needs to be obtain. For a surface partitioned memory, each of the initial addresses of a new surface will be stored. As such, the determination of the initial address 50 of memory surface 22 is readily obtainable. Once the initial address 50 is obtained, the normalized linear address 54 is the obtained from subtracting the initial address 50 from the linear address 55. Having obtained the normalized linear address 54, a band pointer 52 is determined. In essence the band pointer 52 points to the band in which the linear address 55 resides. Having obtained the band pointer, a linear band offset 56 is obtained. The linear band offset 56 refers to the linear offset from the band pointer to the linear address 55.

Having obtained the band pointer 52, the linear band offset 56, the normalized linear address 54, the tiled address 50 may be obtained. This is shown in the right portion of FIG. 4. As shown, the memory mapping is done on a tiled basis wherein at the initial address 50, the first tile is mapped in. This corresponds with the first 256 normalized linear addresses of the memory shown in FIG. 3. Referring back to FIG. 4, the next tile is mapped into memory in a zigzag fashion as shown. This zigzag fashion of mapping the tiles into memory continues until the actual tiled address 50 is reached. Once the tiled address is reached, a tiled band offset 58 may be obtained which is the difference between the band pointer 52 and the tiled address 50. As such, by following the graphical representation of FIG. 4, the linear address 55 can be mapped to the tiled address 50. Thus, when the central processing unit provides the linear address 55, the mapping circuit 28 of the video graphics processor may readily determine the tiled address 50. Note that by mapping the memory as shown in FIGS. 3 and 4, there is no latency from jumping from one tile to the next within the same band. Thus, the seven cycles to read a subsequent page is eliminated when the pages are associated with the same band. Further note that double bands may be included in the linearized mapping such that if the first two tiles of each band would be associated with each other thereby eliminating latency between jumping between two bands. By eliminating latency when retrieving pages of memory, the video graphics processing circuit saves 6 cycles each time page latency is avoided. As one can readily appreciate, when a 640×480 screen is being rendered, there is a substantial amount of time saved by eliminating such page latency.

Figure 5:
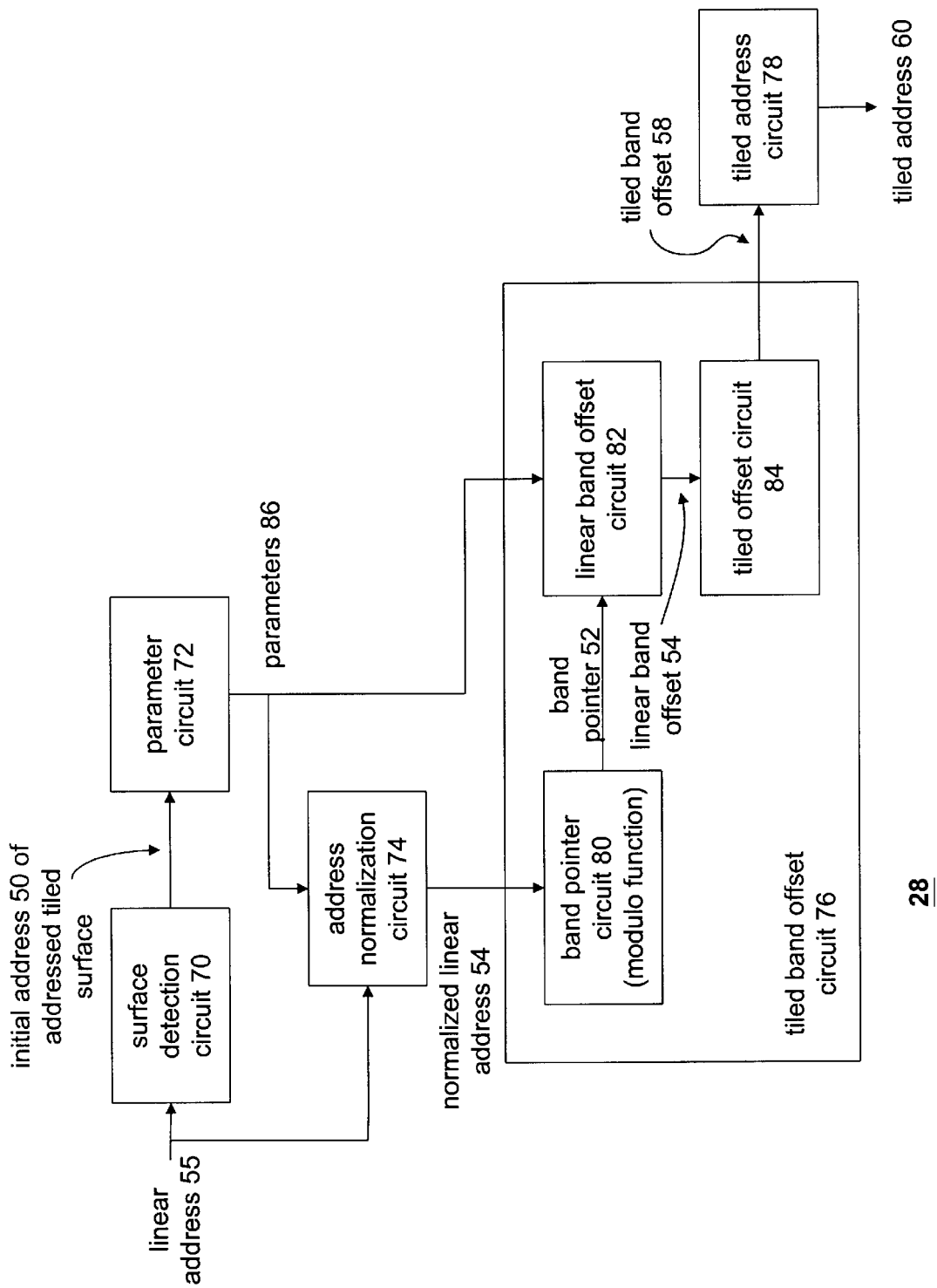
FIG. 5 illustrates a schematic block diagram of the mapping circuit of FIG. 1.

FIG. 5 illustrates a schematic block diagram of the mapping circuit 28. The mapping circuit 28 includes a surface detection circuit 70, a parameter circuit 72, address normalization circuit 74, a tiled band offset circuit 76, and a tiled address circuit 78. The tiled band offset circuit 76 includes a band pointer circuit 80, a linear band offset circuit and a tiling circuit 84. In operation, the surface detection circuit 70 receives the linear address 55. Based on a table lookup, the surface detection circuit 70 can readily determine the initial address 50 of the addressed tile. The initial address 50 is then provided to the parameter circuit 72. The parameter circuit 72 may be a look up table that includes parameters for each of the tiled surfaces in memory 18. The parameters include the pitch of the tiled surface and may also include the initial address of the tiled surface. The pitch, which corresponds to the X value (as shown in FIG. 2) may be determined based on the equation of $k \times 2^N$. For example, for a pitch of 640, k equals 5 while N equals 7. For a pitch of 1,280, k equals 5 and N equals 8. For a pitch of 1,600, k equals 25 and N equals 6. For a pitch of 832, k equals 13 and N equals 6. For a 1,664 pitch, k equals 13, N equals 7.

The parameter circuit 72 provides parameters 86, which includes the initial address 50 and the k and N values of the pitch to the address normalization circuit 74 and the tiled band offset circuit 70. The address normalization circuit 74 also received the linear address 55. Based on the parameters 86 and linear address 55, the address normalization circuit 74 produces the normalized linear address 54. In essence, the normalized linear address may be obtained by subtracting the initial address 50 from the linear address 55 (this is graphically represented in FIG. 4 on the memory 18 shown in the left portion thereof).

The tiled band offset circuit 76 receives the normalized linear address 54 via the band pointer circuit 80 and receives the parameters 86 via the linear band offset circuit 82. The band pointer circuit 80, based on a modulo function, processes the linear address 54 to produce a band pointer 52. The band pointer 52 is provided to the linear band offset circuit 82, which based on the parameters 86, produces the linear band offset 54. The linear band offset 54 is provided to the tiling circuit 84, which produces a tiled band offset 58. The tile address circuit 78 processes the tiled band offset 58 to obtain the tiled address 60. The functionality of the band pointer circuit 80 and the linear band offset circuit 82 will be discussed in greater detail with reference to FIG. 6. The functionality of the tile circuit 84 will be discussed in greater detail with reference to FIG. 7.

Figure 6:
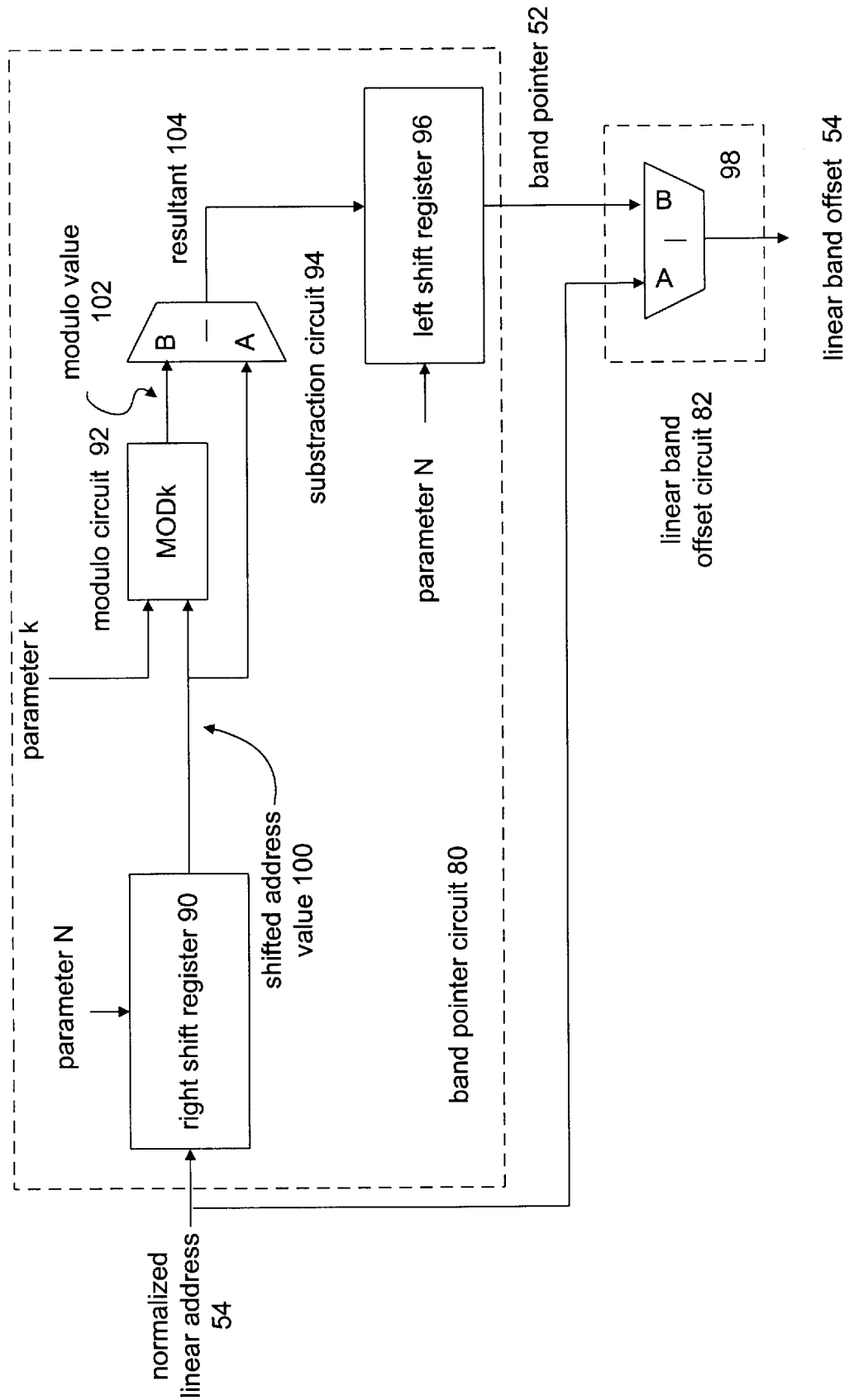
FIG. 6 illustrates a schematic block diagram of the band pointer circuit and linear offset circuit of FIG. 5.

FIG. 6 illustrates a schematic block diagram of the band pointer circuit 80 and the linear band offset circuit 82. The band pointer circuit 80 includes a right shift register 90, a modulo circuit 92, a subtraction circuit 94, and a left shift register 96. The right shift 90 is operably coupled to receive a normalized linear address 54 and parameter N of the parameters 86. As such, the right shift register shifts the normalized linear address by the parameter N to produce a shifted address value 100. The module circuit 92 receives the shifted address value 100 and the parameter k of parameters 86. If parameter k is 1, the modulo circuit 92 and the subtraction circuit may be bypassed. For all other values of k, in other words, k is not equal to 1, the modulo circuit 92 and subtraction circuit 94 are utilized. The modulo circuit 92 performs a modulo function on the shifted address 100 based on the parameter k, to produce a modulo value 102. The shifted address 100 is then subtracted from the modulo value of 102 to obtain a resultant 104. The left shift register 96 receives the resultant 104 and left shifts it by the parameter N to obtain the band pointer 54. For example, assume that the normalized linear address is 2,047, the pitch is 640, the parameter N is 7 and parameter k equals 5. The binary value of the normalized linear address 54 is 0000 0111 1111 1111 (16 bit binary address) is right-shifted by 7 to produce a 16-bit binary value of 0000 0000 0000 1111, or a decimal value of 15. Performing the module function on the shifted address value based on a k value of 5 results in a module value of 11111, or 31 (decimal). The subtraction circuit then subtracts the shifted address 100 from the module value 102 to produce the resultant 104 in this example, binary value 10000, or 16 (decimal). The left-shift register 96 then shifts the resultant by the N parameter, which in this example equals 7. As such, the band pointer 54 is represented in binary value by 0000 0100 0000 0000, or 1024 (decimal).

The linear band offset circuit 82 includes a subtraction circuit 98. The subtraction circuit subtracts the band pointer 52 from the normalized linear address 54 to produce the linear band offset 54. The linear band offset circuit 82 provides the linear band offset 54 to the tiling circuit 84.

Figure 7:
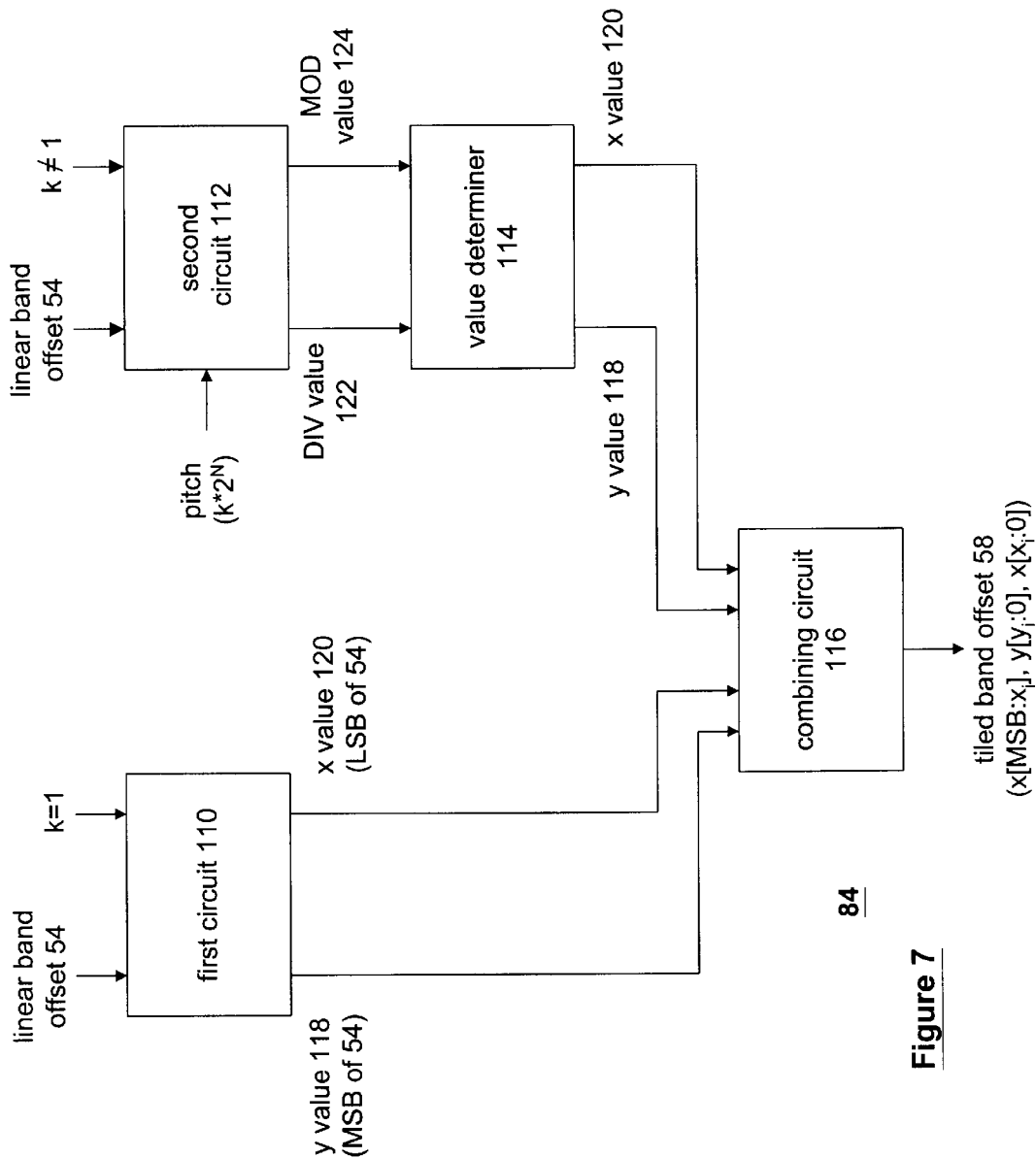
FIG. 7 illustrates a schematic block diagram of the tiling circuit of FIG. 5.

FIG. 7 illustrates a schematic block diagram of the tiling circuit 84. The tiling circuit 84 includes a first circuit 100, a second circuit 112, a look-up table 114, and a combining circuit 116. The first circuit 110 is coupled to receive the linear band offset 54 and the parameter k. The first circuit 100 functions when k equals 1 to convert the linear band offset 54 into a Y value 118 and an X value 120. The Y value is represented by the most significant bits of the linear band offset while the X value is represented by the lower significant bits of the linear band offset value. For example, assume that the display is a 512×384 pixels and thus the pitch equals 512 or $2^9$. Further assume that a band is 512 pixels by 16 lines thus there are 24 bands in this display and there are 8 tiles per band Further assume that the normalized linear address is 10,000. The band pointer would then be 8,192, which is pointing to the second band in the display, and the linear band offset would be 1,808 which in binary is an 18-bit value of 00 0000 0111 0001 0000. The nine most significant bits 000000011 represents the Y value 118, which is three (decimal) and the X value is 100010000 (binary), which is 272 (decimal). The combining circuit 116 receives the Y value 118 and the X value 120 to produce a tiled band offset 58. In general the combining circuit 116 combines the X and Y values 118 and 120 based on the equation ($x[MSB:x_i]$, $y[y_i:0]$, $x[x_i:0]$). Continuing with the example, the tiled address is located in the 5th tile at the third line and the 16th pixel in the tile. Thus, the tiled band offset is 4,240 (which equals 4 times 1024), the memory locations for a particular tile plus 2×64 (where 64 represents the width of a tile) plus 16 (which represents the location within the third line of the tile).

The second circuit 112 receives the linear band offset 54, the k parameter and the pitch. The second circuit 112 functions when the k value is not equal to 1. The second circuit 112 generates a DIV value 122, and a MOD value 124 from the linear band offset 54. The DIV value 122 and the MOD value 124 are integer values that are obtained by dividing the linear band offset by the k value, where the DIV value 122 is the whole number and the MOD value 124 is the remainder. The look-up table 114 receives the DIV value 122 and the MOD value 124 to retrieve the Y value 118 and the X value 120. The combining circuit 116 processes the Y value and X value to obtain the tiled band offset 58. The tiled address 50 is then readily obtainable from the tiled band offset address, the band pointer and the initial address 50.

Figure 8:
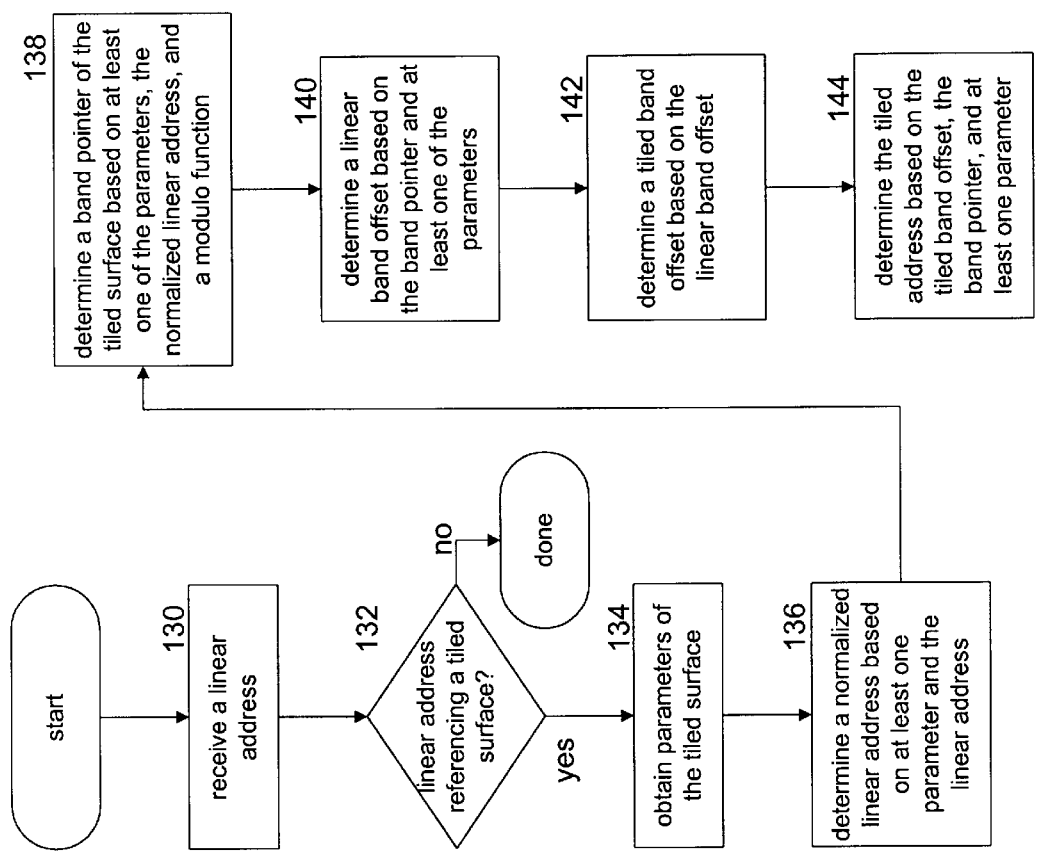
FIG. 8 illustrates a schematic block diagram of a method for mapping a linear address to a tiled address in accordance with the present invention.

FIG. 8 illustrates a logic diagram of a method for mapping a linear address to a tiled address. The process begins at step 130 where a linear address is received from a central processing unit. The process then proceeds to step 132 where a determination is made as to whether the linear address is referencing a tiled surface. If not, the process is complete for this particular linear address. If so, the process proceeds to step 134 where parameters of a tiled surface are obtained. The parameters of the tiled surface include an initial address of the tiled surface and a pitch of the tiled surface. The pitch may be defined as the equation $k * 2^N$.

The process then proceeds to step 136 where a normalized linear address is determined based on at least one of the parameters and the linear address. The process then proceeds to step 138 where a band pointer of the tiled surface is determined based on at least one of the parameters, the normalized linear address, and a modulo function. The process then proceeds to step 140 where a linear band offset is obtained based on the band pointer and at least one of the parameters. The process then proceeds to step 142 where a tile band offset is determined based on the linear band offset. The process then proceeds to step 134 where the tiled address is determined based on the tile band offset, the band pointer and at least one parameter.

Figure 9:
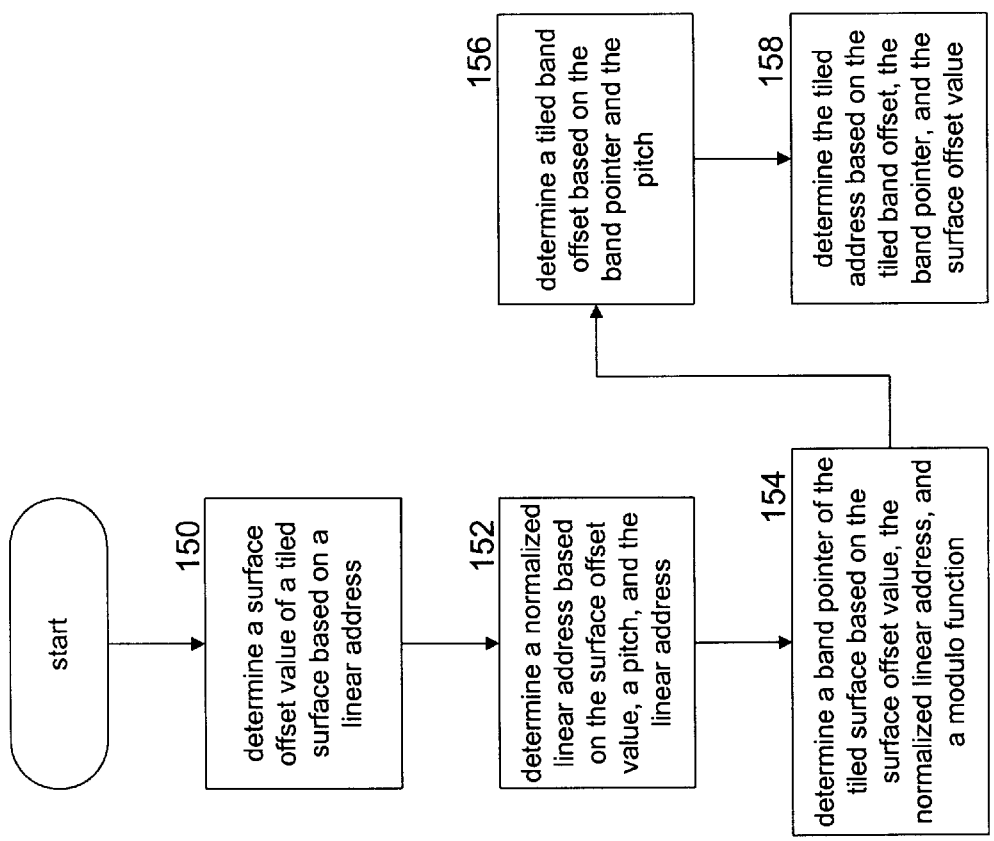
FIG. 9 illustrates a logic diagram for an alternate method of converting a linear address to a tiled address in accordance with the present invention.

FIG. 9 illustrates a logic diagram of an alternate method for mapping a linear address to a tiled address. The process begins at step 150 where a surface offset value of a tiled surface is obtained based on a linear address. The process then proceeds to step 152 where a normalized linear address is determined based on the surface offset value, a pitch, and the linear address. Note that the surface offset value equates to the initial address 50 of a tiled memory surface 22.

The process then proceeds to step 154 where a band pointer of the titled surface is determined based on the surface offset value, the normalize linear address, and a modular function. The process then proceeds to step 156 where a tiled band offset is determined based on the band pointer and the pitch. The process then proceeds to step 158 where the titled address is determined based on the titled band offset, the band pointer, and the surface offset value.

A video graphics circuit that includes a processing unit and memory may perform the methods of FIGS. 8 and 9. The processing unit may be a microprocessor, microcontroller, digital signal processor, and/or any other device that manipulates digital information based on programming instructions. The memory may be read-only memory, random access memory, hard drive memory, floppy disk memory, magnetic tape memory, and/or any other device that stores digital information.

The preceding discussion has presented a method and apparatus for mapping a linear address to a tiled address with minimal page latency. By formatting the memory in the tiles, as described, the latency from retrieving a page of memory is reduced within a particular band of memory. The band to band latency may also be reduced by reconfiguring the tiles to a 2×2 quadrant, 3×3 quadrant, etc., such that each tile in the quadrant is the subsequent tile to a preceding one. Thus, the present invention provides a method and apparatus for reducing latency that results from reading pages from memory.

What is claimed is:

1. A method for mapping a linear address to a tiled address, the method comprises the steps of:
   a) receiving the linear address;
   b) determining whether the linear address is referencing a tiled surface;
   c) when the linear address is referencing a tiled surface, obtaining parameters of the tiled surface;
   d) determining a normalized linear address based on at least one of the parameters and the linear address;
   e) determining a band pointer of the tiled surface based on at least one of the parameters, the normalized linear address, and a modulo function, wherein the band pointer points to a normalized initial address of a band of the tiled surface;
   f) determining a linear band offset based on the band pointer and at least one of the parameters;
   g) determining a tiled band offset based on the linear band offset; and
   h) determining the tiled address based on the tiled band offset, the band pointer, and at least one of the parameters.

2. The method of claim 1, wherein step c) further comprises obtaining an initial address of the tiled surface and a pitch of the tiled surface as the parameters.

3. The method of claim 2 further comprises obtaining a pixel size, an N value, and a k value as the parameters, wherein the N and k values are based on the pitch of $k*2^N$.

4. The method of claim 3, wherein step (e) further comprises right shifting the linear address by the N value to produce a shifted address value, performing the modulo function upon the shifted address value, based on the k value, to obtain a modulo value, subtracting the modulo value from the shifted address value to produce a resultant, and left shifting the resultant by the N value to produce the band pointer.

5. The method of claim 3, wherein step (g) further comprises, when the k value equals one, determining an x value and a y value for the band, where the x value is obtained from LSBs of the linear band offset and the y value is obtained from the MSBs of the linear band offset.

6. The method of claim 5 further comprises combining the x value and the y value to obtain the tiled band offset, wherein the x value and y value are combined based on $(x[MSB:x_i], y[y_i:0], x[x_i:0])$.

7. The method of claim 3, wherein step (g) further comprises, when the k value is not equal to one, determining an x value and a y value based on a DIV function of the linear band offset and the pitch that produces a DIV value and a MOD function of the linear band offset and the pitch that produces a MOD value.

8. The method of claim 7 further comprises accessing a look-up table based on the DIV value and the MOD value to obtain the x value and the y value.

9. The method of claim 1, wherein step (f) further comprises subtracting the band pointer from the linear address to obtain the linear band offset.

10. A method for mapping a linear address to a tiled address, the method comprises the steps of:
    a) determining a surface offset value of a tiled surface based on a linear address;
    b) determining a normalized linear address based on the surface offset value, a pitch, and the linear address;
    c) determining a band pointer of the tiled surface based on the surface offset value, the normalized linear address, and a modulo function, wherein the band pointer points to a normalized initial address of a band of the tiled surface;
    d) determining a tiled band offset based on the band pointer and the pitch, and
    e) determining the tiled address based on the tiled band offset, the band pointer, and the surface offset value.

11. The method of claim 10, wherein step (d) further comprises determining a linear band offset based on the band pointer and the pitch and determining the tiled band offset based on the linear band offset.

12. The method of claim 10, wherein the pitch comprises an N value and a k value, wherein the N and k values are related to the pitch based on the equation $k*2^N$.

13. The method of claim 12, wherein step (c) further comprises right shifting the linear address by the N value to produce a shifted address value, performing the modulo function upon the shifted address value, based on the k value, to obtain a modulo value, subtracting the modulo value from the shifted address value to produce a resultant, and left shifting the resultant by the N value to produce the band pointer.

14. The method of claim 12, wherein step (d) further comprises, when the k value equals one, determining an x value and a y value for the band, where the x value is obtained from LSBs of the linear band offset and the y value is obtained from the MSBs of the linear band offset.

15. The method of claim 14 further comprises combining the x value and the y value to obtain the tiled band offset, wherein the x value and y value are combined based on $(x[MSB:x_i], y[y_i:0], x[x_i:0])$.

16. The method of claim 12, wherein step (d) further comprises, when the k value is not equal to one, determining an x value and a y value based on a DIV function of the linear band offset and the pitch that produces a DIV value and a MOD function of the linear band offset and the pitch that produces a MOD value.

17. The method of claim 16 further comprises accessing a look-up table based on the DIV value and the MOD value to obtain the x value and the y value.

18. A mapping circuit that maps a linear address to a tiled address of a memory, the mapping circuit comprises:

surface detection circuit operably coupled to receive the linear address and determines whether the linear address identifies a tiled surface in the memory;

parameter circuit operably coupled to the surface detection circuit, wherein the parameter circuit provides parameters of the tiled surface when the linear address identifies the tiled surface;

address normalization circuit operably coupled to the receive the linear address and the parameters, wherein the address normalization circuit generates a normalized linear address based on the linear address and at least one of the parameters;

tiled band offset circuit operably coupled to receive the normalized linear address and at least one of the parameters and generates, therefrom, a tiled band offset, wherein the tiled band offset circuit includes:
band pointer circuit operably coupled to receive the normalized linear address and to produce therefrom, based on a modulo function, a band pointer;
linear band offset circuit operably coupled to receive the band pointer and at least one of the parameters and to produce therefrom a linear band offset;
tiling circuit operably coupled to receive the linear band offset and to produce therefrom the tiled band offset; and tiled address circuit operably coupled to receive the tiled band offset and to produce therefrom the tiled address.

19. The mapping circuit of claim 18, wherein the parameters comprise an initial address of the tiled surface, a pitch of the tiled surface, a pixel size, an N value, and a k value, wherein the N and k values are based on the pitch of $k*2^N$.

20. The mapping circuit of claim 19, wherein the band pointer circuit comprises:

a right shift register operably coupled to shift the linear band offset by the N value to produce a shifted address value;

a modulo circuit operably coupled to receive the k value and the shifted address value, wherein the modulo circuit performs a modulo function upon the shifted address value based on the k value to obtain a modulo value, subtraction circuit operably coupled to subtract the modulo value from the shifted address value to produce a resultant; and a left shift register operably coupled to shift the resultant by the N value to produce the band pointer.

21. The mapping circuit of claim 19, wherein the tiling circuit further comprises:

a first circuit operably coupled to receive the linear band offset when the k value equals one, wherein the first circuit determining an x value and a y value for the band, where the x value is obtained from LSBs of the linear band offset and the y value is obtained from the MSBs of the linear band offset;

a second circuit operably coupled to receive the linear band offset when the k value is not equal to one, the second circuit determines a DIV value based on a DIV function of the linear band offset and the pitch and a MOD value based on a MOD function of the linear band offset and the pitch; and a look-up table operably coupled to the second circuit, wherein the look-up table is accessed based on the DIV value and the MOD value to obtain the x value and the y value; and a combining circuit operably coupled to the first circuit, wherein the combining circuit combining the x value and the y value to obtain the tiled band offset, wherein the x value and y value are combined based on $(x[MSB:x_i], y[y_i:0], x[x_i:0])$.

22. A mapping circuit that maps a linear address to a tiled address of a memory, the mapping circuit comprises:

a processing unit; and memory operably coupled to the processing unit, wherein the memory stores programming instructions that, when read by the processing unit, cause the processing unit to obtain parameters of a tiled surface based on a linear address; determine a normalized linear address based on at least one of the parameters and the linear address; determine a band pointer of the tiled surface based on at least one of the parameters, the normalized linear address, and a modulo function, wherein the band pointer points to a normalized initial address of a band of the tiled surface; determine a tiled band offset based on the band pointer and at least one of the parameters; and determine the tiled address based on the tiled band offset, the band pointer, and at least one of the parameters.

23. The mapping circuit of claim 22, wherein the parameters comprise an initial address of the tiled surface, a pitch of the tiled surface, a pixel size, an N value, and a k value, wherein the N and k values are based on the pitch of $k*2^N$.

24. The mapping circuit of claim 23, wherein the memory further comprises programming instructions that cause the processing unit to determine a linear band offset based on the band pointer and the pitch and determining the tiled band offset based on the linear band offset.

25. The mapping circuit of claim 23, wherein the memory further comprises programming instructions that cause the processing unit to right shift the linear address by the N value to produce a shifted address value, perform the modulo function upon the shifted address value, based on the k value, to obtain a modulo value, subtract the modulo value from the shifted address value to produce a resultant, and left shift the resultant by the N value to produce the band pointer.

26. The mapping circuit of claim 23, wherein the memory further comprises programming instructions that cause the processing unit to determine an x value and a y value for the band when the k value equals one, where the x value is obtained from LSBs of the linear band offset and the y value is obtained from the MSBs of the linear band offset.

27. The mapping circuit of claim 26, wherein the memory further comprises programming instructions that cause the processing unit to combine the x value and the y value to obtain the tiled band offset, wherein the x value and y value are combined based on $(x[MSB:x_i], y[y_i:0], x[x_i:0])$.

28. The mapping circuit of claim 23, wherein the memory further comprises programming instructions that cause the processing unit to determine an x value and a y value based on a DIV function of the linear band offset and the pitch that produces a DIV value and a MOD function of the linear band offset and the pitch that produces a MOD value when the k value is not equal to one.

29. The mapping circuit of claim 23, wherein the memory further comprises programming instructions that cause the processing unit to access a look-up table based on the DIV value and the MOD value to obtain the x value and the y value.

30. A video graphics circuit comprising:
 a video processor operably coupled to provide pixel data to a display;
 memory operably coupled to store the pixel data prior to being displayed on the display; and
 a mapping circuit operably coupled to the video processor and the memory, wherein the mapping circuit includes:
  surface detection circuit operably coupled to receive the linear address and determines whether the linear address identifies a tiled surface in the memory;
  parameter circuit operably coupled to the surface detection circuit wherein the parameter circuit provides parameters of the tiled surface when the linear address identifies the tiled surface;
  address normalization circuit operably coupled to the receive the linear address and the parameters, wherein the address normalization circuit generates a normalized linear address based on the linear address and at least one of the parameters;
  tiled band offset circuit operably coupled to receive the normalized linear address and at least one of the parameters and generates, therefrom a tiled band offset, wherein the tiled band offset circuit includes:
   band pointer circuit operably coupled to receive the normalized linear address and to produce therefrom, based on a modulo function, a band pointer;
   linear band offset circuit operably coupled to receive the band pointer and at least one of the parameters and to produce therefrom a linear band offset;
   tiling circuit operably coupled to receive the linear band offset and to produce therefrom the tiled band offset; and
  tiled address circuit operably coupled to receive the tiled band offset and to produce therefrom the tiled address.

31. The video graphics circuit of claim 30, wherein the parameters comprise an initial address of the tiled surface, a pitch of the tiled surface, a pixel size, an N value, and a k value, wherein the N and k values are based on the pitch of $k*2^N$.

32. The video graphics circuit of claim 31, wherein the band pointer circuit comprises:
 a right shift register operably coupled to shift the linear band offset by the N value to produce a shifted address value;
 a modulo circuit operably coupled to receive the k value and the shifted address value, wherein the modulo circuit performs a modulo function upon the shifted address value based on the k value to obtain a modulo value,
 subtraction circuit operably coupled to subtract the modulo value from the shifted address value to produce a resultant; and
 a left shift register operably coupled to shift the resultant by the N value to produce the band pointer.

33. The video graphics circuit of claim 31, wherein the tiling circuit further comprises:
 a first circuit operably coupled to receive the linear band offset when the k value equals one, wherein the first circuit determining an x value and a y value for the band, where the x value is obtained from LSBs of the linear band offset and the y value is obtained from the MSBs of the linear band offset;
 a second circuit operably coupled to receive the linear band offset when the k value is not equal to one, the second circuit determines a DIV value based on a DIV function of the linear band offset and the pitch and a MOD value based on a MOD function of the linear band offset and the pitch; and
 a look-up table operably coupled to the second circuit, wherein the look-up table is accessed based on the DIV value and the MOD value to obtain the x value and the y value; and
 a combining circuit operably coupled to the first circuit, wherein the combining circuit combining the x value and the y value to obtain the tiled band offset, wherein the x value and y value are combined based on $(x[MSB:x_i], y[y_i:0], x[x_i:0])$.

* * * * *